US006977956B2

(12) United States Patent
Ando et al.

(10) Patent No.: US 6,977,956 B2
(45) Date of Patent: Dec. 20, 2005

(54) PILOT SIGNAL RECEPTION METHOD AND RECEIVER

(75) Inventors: Kimiaki Ando, Yokosuka (JP); Hiroki Shinde, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 780 days.

(21) Appl. No.: 09/778,896

(22) Filed: Feb. 8, 2001

(65) Prior Publication Data

US 2001/0033604 A1 Oct. 25, 2001

(30) Foreign Application Priority Data

Feb. 14, 2000 (JP) ............................ 2000-035052

(51) Int. Cl.[7] ............................................ H04B 1/707

(52) U.S. Cl. ...................... 375/147; 375/136; 375/316; 375/130; 370/335; 370/342

(58) Field of Search ................................ 375/140, 141, 375/147, 316, 136, 130, 149, 142, 367, 148, 375/133, 144, 150, 267, 135, 361; 455/422.1, 455/69, 458; 370/315, 335, 441, 442, 342; 445/442

(56) References Cited

U.S. PATENT DOCUMENTS

| | | | | |
|---|---|---|---|---|
| 5,430,889 | A | 7/1995 | Hulbert et al. | |
| 5,528,624 | A * | 6/1996 | Kaku et al. | 375/150 |
| 5,544,196 | A | 8/1996 | Tiedemann et al. | |
| 5,548,613 | A * | 8/1996 | Kaku et al. | 375/150 |
| 5,644,590 | A * | 7/1997 | Sugita | 375/130 |
| 5,809,062 | A | 9/1998 | Hulbert | |
| 5,963,583 | A * | 10/1999 | Davidovici et al. | 375/130 |
| 6,141,337 | A * | 10/2000 | Uta et al. | 370/350 |
| 6,212,243 | B1 * | 4/2001 | Klein et al. | 375/316 |
| 6,490,265 | B1 * | 12/2002 | Sasaki et al. | 370/342 |
| 6,539,047 | B1 * | 3/2003 | Moon | 375/135 |
| 6,795,509 | B1 * | 9/2004 | Yamamoto et al. | 375/267 |

FOREIGN PATENT DOCUMENTS

| | | |
|---|---|---|
| EP | 0822668 | 2/1998 |
| EP | 0898379 | 2/1999 |
| JP | 9-64846 | 3/1997 |
| JP | 9-298489 | 11/1997 |
| JP | 11145933 | 5/1999 |
| JP | 11150521 | 6/1999 |
| JP | 11234172 | 8/1999 |
| WO | 00/07377 | 2/2000 |

OTHER PUBLICATIONS

Wen-Yi, Kuo et al., "User Slot Design and Performance Analysis for Burst Mode Communications with Fading and Frequency Uncertainty", 1994 IEEE GlobeCom. Communications Theory. Mini-Conference Record., San Francisco, CA, USA, on Nov. 28-Dec. 2, 1994.

(Continued)

*Primary Examiner*—Stephen Chin
*Assistant Examiner*—Ted M. Wang
(74) *Attorney, Agent, or Firm*—Greenblum & Bernstein, P.L.C.

(57) ABSTRACT

The pilot signal reception method of the present invention irregularly receives pilot symbols. That is, the pilot signal reception method performs irregular reception processing such as randomizing reception timings or changing reception timings according to reception situations as appropriate to reduce influences of fading. Randomization of reception timings is implemented by generating random timings using a random timing generation circuit.

3 Claims, 15 Drawing Sheets

OTHER PUBLICATIONS

English Language Abstract of JP 9-64846.
English Language Abstract of JP 11-150521.
English Language Abstract of JP 11-234172.
English Language Abstract of JP 09-298489.
English Language Abstract of JP 11-145933.

* cited by examiner

PILOT SIGNAL RECEPTION METHOD AND RECEIVER

BACKGROUND OF THE INVENTION

1. Field of the Invention

The present invention relates to a pilot signal reception method and receiver.

2. Description of the Related Art

In a CDMA communication, a pilot signal is used to acquire synchronization in a mobile station, create a delay profile and correct frequencies in a mobile station, and adjust reception timings in a mobile station, etc. This pilot signal is sent from a base station.

An IS-95-compliant communication system is provided with a dedicated pilot channel 100 as shown in FIG. 12A.

Furthermore, in a new standard W-CDMA system, a dedicated pilot channel 101 is provided in addition to a channel with pilot signals (PL) inserted at predetermined intervals.

That a dedicated pilot signal channel exists means that pilot signals are output from the transmitting side all the time.

A concrete pilot channel (100 and 101) format example is shown in FIG. 12C.

What is shown in the upper part of FIG. 12C is an example of a pilot signal subjected to data modulation (format example 1).

That is, in the case of format example 1, the pilot channel is configured by slots made up of a set of several to a few tens of symbols, which are information units spread using a specified number of spreading code chips.

Furthermore, in the example shown in the lower part of FIG. 12C (format example 2), no data modulation is applied to the pilot channel. For example, since a common pilot channel is commonly used by base stations, the common pilot channel need not be subjected to data (symbol) modulation and such a format without data (symbol) modulation (that is, format with no symbol concept) is also accepted.

Here, reception of a spread/modulated pilot channel will be considered.

When receiving pilot signals, it is desirable to intermittently receive the pilot signals rather than receiving the pilot signals all the time and thereby reduce the amount of pilot data in order to alleviate load on a circuit carrying out signal processing such as a DSP and reduce the amount of pilot data.

The inventor of the present invention has studied a method of performing despreading processing and then demodulation on a predetermined number of known symbols in slots at predetermined timings as shown in FIG. 14.

As a result, it has been discovered that reception according to this method provides cyclic and burst-like demodulation of pilot symbols, and therefore can provide reception with low reliability at most when the intensity of the signal is reduced due to cyclic fading or burst-like fading.

That is, as shown in the lower part of FIG. 14, in the case where a reception timing (reception segment) of a pilot signal coincides with a valley of cyclic variation of the intensity of the reception signal, an S/N (reception quality) with respect to reception of the pilot signal deteriorates. Therefore, the reliability of data in the reception segment is also reduced.

The present invention has been implemented focusing on such investigation results and it is an object of the present invention to attain reception of pilot signals with high reliability by reducing adverse influences of fading.

SUMMARY OF THE INVENTION

The present invention performs reception of pilot symbols irregularly.

That is, the present invention performs irregular reception processing by randomizing reception timings or changing reception timings by adapting reception timings to reception situations as appropriate. This makes the system less susceptible to cyclic or burst-like fading.

In the case where a spread signal including a dedicated pilot signal channel is received, the reception method of the present invention divides the reception signal into two systems. The signal on one system is subjected to normal despreading to demodulate data other than pilot signals. The signal on the other system is subjected to irregular despreading to demodulate pilot signals.

An aspect of the pilot signal reception method of the present invention generates completely random timings using random numbers, etc.

Another aspect of the pilot signal reception method of the present invention despreads signals at timings other than the timing of despreading in the previous time segment.

Another aspect of the pilot signal reception method of the present invention measures the signal intensity of symbols after despreading and changes the despreading timing in such a way as to avoid reception at a timing corresponding to valleys of fading.

Another aspect of the pilot signal reception method of the present invention predetermines (irregularly) the positions (timing) at which pilot symbols are placed between a transmission apparatus and reception apparatus on a channel where symbols other than the pilot symbols are also placed. Then, despreading is carried out using a random timing generator common to the transmitting side and receiving side.

An aspect of a CDMA receiver of the present invention comprises an A/D converter, despreading circuit, random timing generation circuit, reception control circuit and phase/signal intensity detection circuit. This configuration makes reception timings irregular, allowing the system to perform reception less susceptible to cyclic, burst-like fading.

Another aspect of the CDMA receiver of the present invention comprises a despreading timing determination circuit and a despreading timing retention circuit that retains timings generated by the despreading timing determination circuit and the despreading timing generation circuit changes reception timings based on past despreading timings retained by the despreading timing retention circuit. This configuration allows despreading to be performed at a timing different from the immediately preceding reception timing. Thus, this configuration allows the system to perform reception less susceptible to cyclic fading.

Furthermore, another aspect of the CDMA receiver of the present invention adopts a configuration that returns the output of the despreading circuit to the despreading timing determination circuit. This configuration makes it possible to determine despreading timings based on the intensity of the despread signal and perform reception that matches the reception situation.

Furthermore, another aspect of the CDMA receiver of the present invention adopts a configuration comprising a despreading chip number determination circuit and allowing the output of the despreading circuit to be input to the despreading chip number determination circuit. This configuration allows a channel not subjected to data modulation to be demodulated by despreading by an arbitrary number of chips from a certain chip. This enhances the flexibility of despreading timings. It is also possible to adaptively change the number of chips to be despread according to the situation of the propagation path.

Another aspect of the present invention allows both the transmission apparatus and reception apparatus to generate transmission timings and reception timings using a common random generation circuit.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, embodiments of the present invention will be explained in detail below.

(Embodiment 1)

Figure 1:
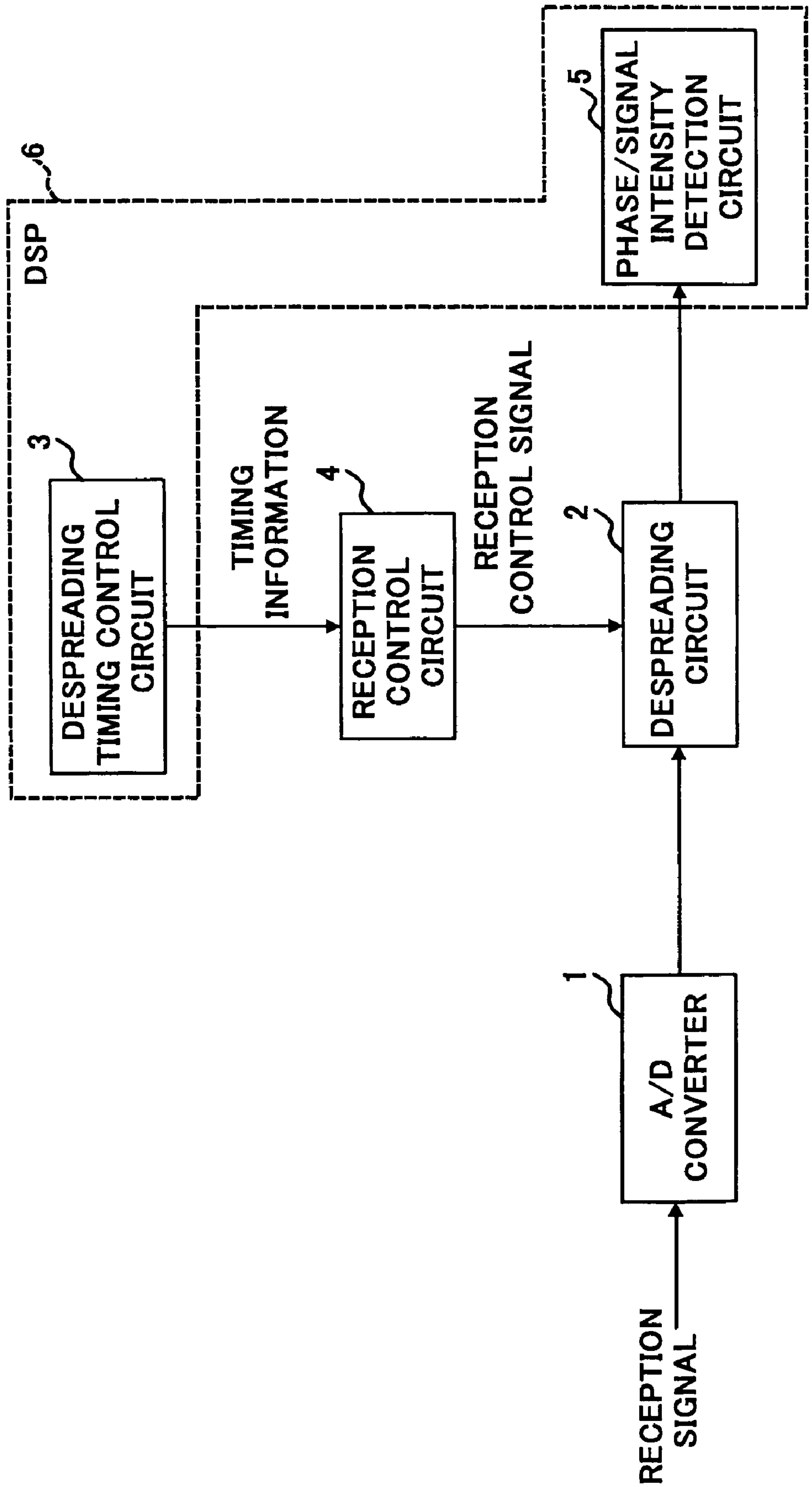
FIG. 1 is a block diagram showing a configuration example of a demodulation section of a CDMA receiver of the present invention.

FIG. 1 is a block diagram showing a main configuration of a CDMA receiver of the present invention.

As shown in the figure, this CDMA receiver is provided with A/D conversion circuit 1, despreading circuit 2, random timing (irregular timing) determination circuit 3, reception control circuit 4 and phase/signal intensity detection circuit 5.

In order to perform coherent detection or correct the frequency of a reference clock in a receiver, it is necessary to determine phase variations in reception symbols.

To determine phase variations in reception symbols, it is necessary to determine variations in the intensity of symbol signals. For this reason, this embodiment is provided with phase/signal intensity detection circuit 5.

Synchronization acquisition, creation of a delay profile, correction of the frequency of a reference clock and adjustment of reception timings, etc. are carried out using the signal intensity of pilot symbols (pilot signals) detected in this phase/signal intensity detection circuit 5.

This embodiment makes reception timings of pilot symbols irregular using random timing determination circuit 3. This makes the system less susceptible to fading during reception of pilot signals.

Figure 14:
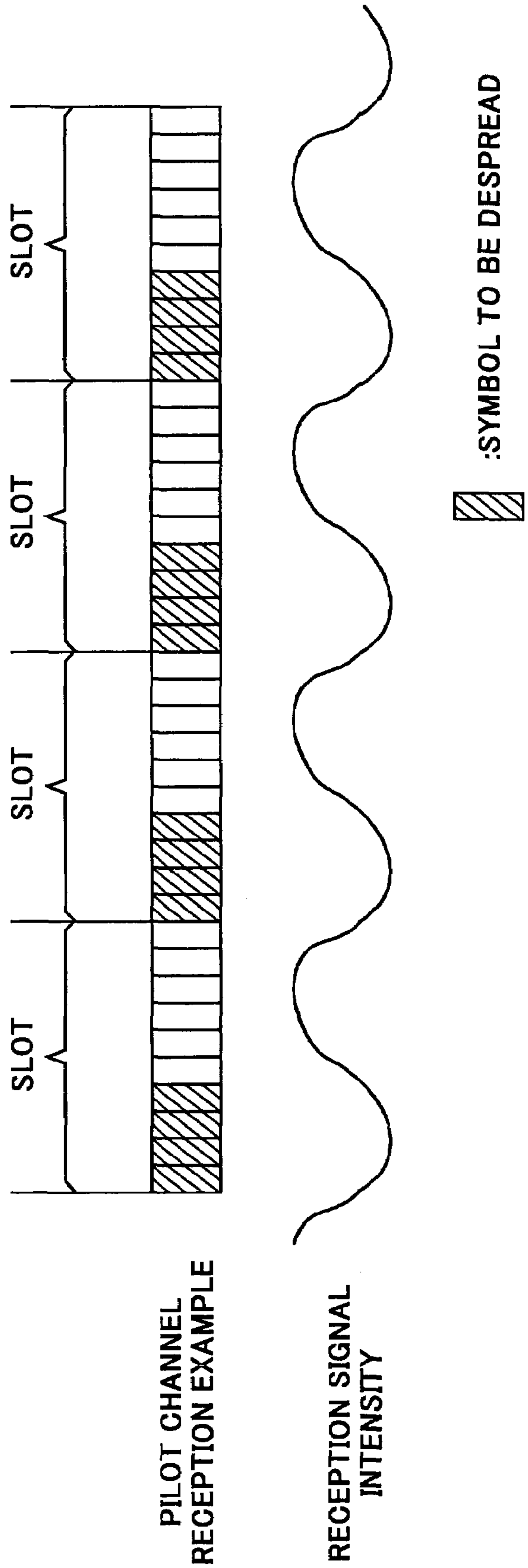
FIG. 14 is a drawing to explain the pilot signal reception method in a comparison example studied by the inventor of the present invention prior to the present invention.

When cyclic and intermittent pilot signals as shown in FIG. 14 are received, the time period during which the intensity of the reception signal is lowered due to fading may coincide with the time period during which pilot signals are received. In this case, reception continues with low signal intensity all the time unless the fading cycle is shifted, which deteriorates the S/N ratio and deteriorates reliability of reception.

Thus, reception timing information is generated by random timing generation circuit 3, which produces arbitrary timings not cyclically but randomly and reception control circuit 4 controls operation of despreading circuit 2 based on the reception timing information.

If pilot signals are received at random timings, the risk of directly receiving influences of the reduction in the reception intensity due to fading is reduced all the more because the reception timings are distributed. Thus, the average S/N ratio of the reception signal improves, making it possible to receive signals with high reliability. Despreading circuit 2 outputs a demodulated signal and transmits the demodulated signal to phase/signal intensity detection circuit 5.

Here, the term "random" is not limited to disorder in a strictly mathematical sense using a random numbers table, etc.

"Random" is used as a term that broadly means what is generally called "pseudo-random" or states which can be proven independent of each other without regularities between past, current and future states.

More specifically, the term "random" has also connotations "non-cyclic" or "not fixed" (that is, not regular). This specification expresses "irregular" including all these connotations.

A random signal can be generated using, for example, a random number generation circuit, a code generation circuit using predetermined functions. Moreover, it is also possible to randomize reception timings in a pseudo-form by registering multiple patterns about reception timings beforehand (patterns are mutually independent) and selecting one of these patterns according to the reception situation.

Figure 13:
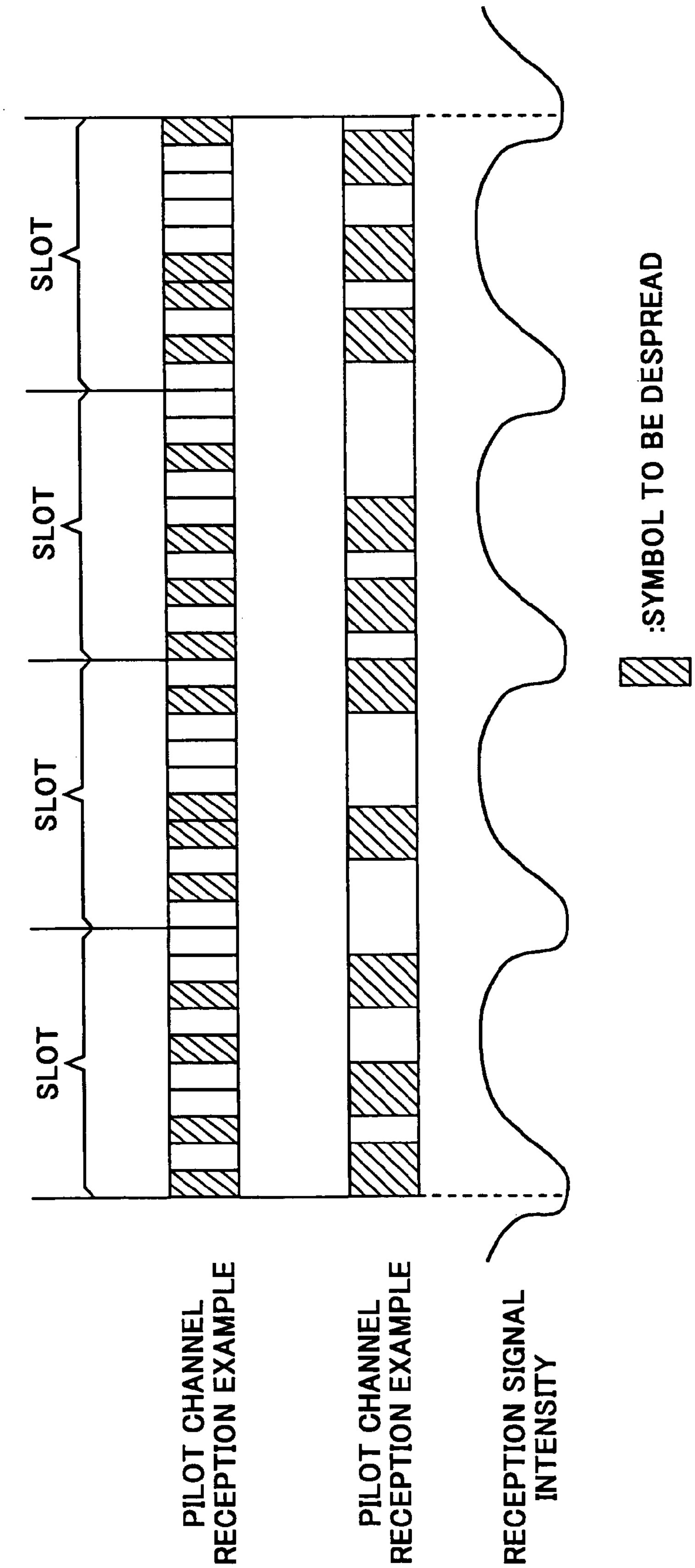
FIG. 13 is a drawing to explain an example of pilot signal reception method of the present invention.

FIG. 13 shows examples of reception at random timings. In the reception example shown in the upper part of FIG. 13, despreading is performed at irregular timings on a spread/modulated pilot channel (a concept of slot exists). In the figure, symbols to be despread are hatched.

On the other hand, the reception example shown in the lower part of FIG. 13 is a case where a common pilot channel (without a concept of slot) without data modulation is received. In this case, it is possible to despread an arbitrary number of chips from a chip at a random position.

At the bottom of FIG. 13 is an illustration showing how the intensity of the reception signal fluctuates. As is shown in the figure, the intensity of the reception signal fluctuates cyclically under the influence of fading.

On the other hand, reception timings of pilot signals are randomized. Therefore, the system is less susceptible to fading and the average S/N of the reception signal improves.

Thus, randomizing reception timings prevents the intensity of the reception signal from extremely reducing under the influence of fading valleys even if the intensity of the reception signal cyclically fluctuates.

FIG. 14 shows a comparison example where, for example, known symbol patterns are concentrated at predetermined locations in a slot and a predetermined number of symbols are received during a predetermined time period in the slot. In this case, when the reception segment coincides with the cycle of fading, the S/N of the reception signal will deteriorate extremely.

Thus, according to the CDMA receiver of this embodiment, it is possible to reduce the probability that reception timings of pilot signals will coincide with the period during which the intensity of the signal is lowered due to fading, making it possible to receive pilot signals with high reliability.

Figure 2:
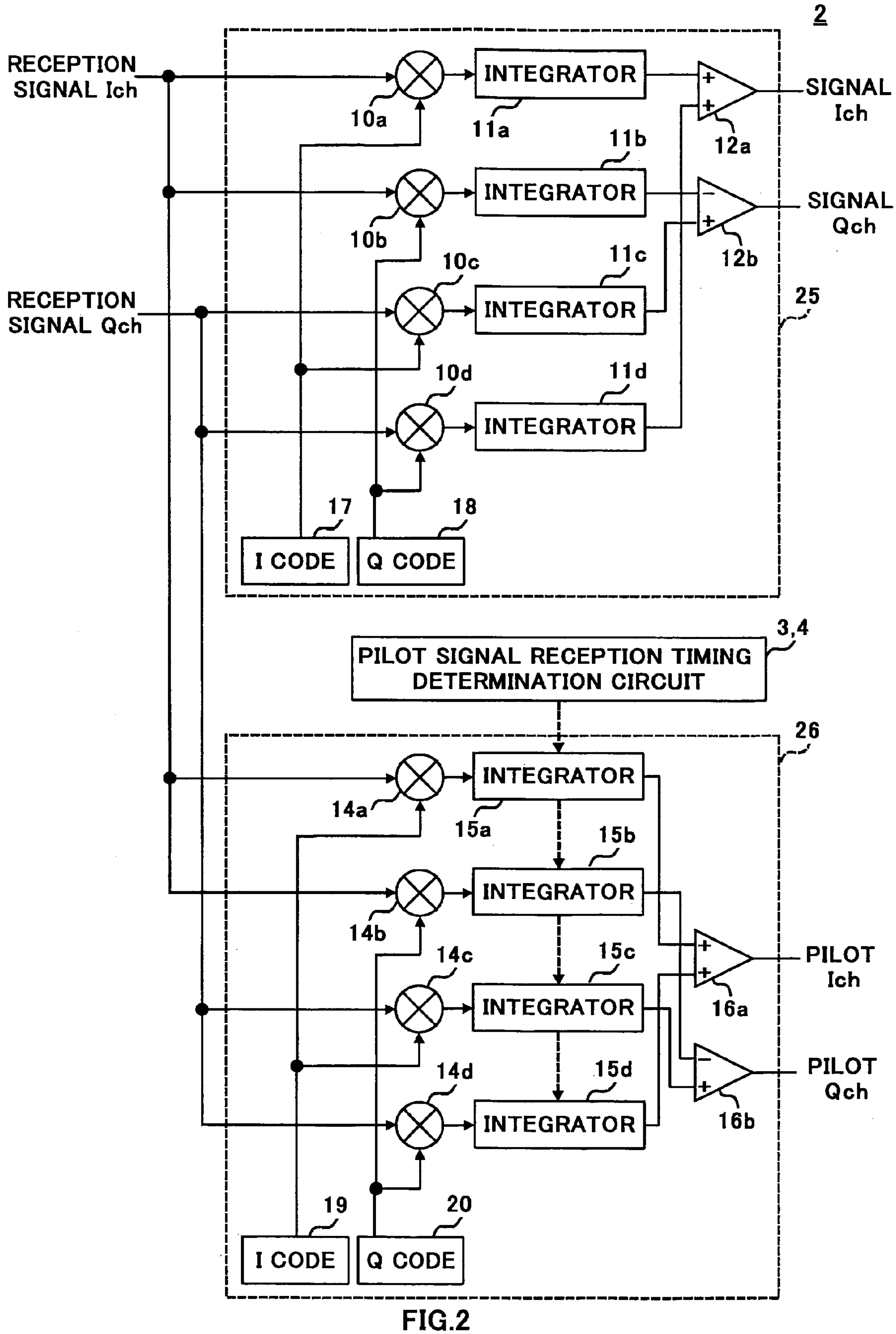
FIG. 2 is a block diagram showing a specific configuration example of the despreading circuit shown in FIG. 1.

FIG. 2 shows a concrete example of the circuit configuration of the despreading circuit 2.

Despreading circuit 2 applies despreading to a quadriphase shift keying (QPSK) signal input. The signal input includes a dedicated pilot signal channel and other channels.

Despreading circuit 2 is provided with circuit 25 for despreading data other than pilot signals and circuit 26 for despreading pilot signals.

Circuit 25 has a configuration almost identical to that of circuit 26.

That is, both circuits have I code generators 17 and 19, Q code generators 18 and 20, multipliers 10*a* to 10*d* and 14*a* to 14*d,* integrators 11*a* to 11*d* and 15*a* to 15*d* and comparators 12*a,* 12*b,* 16*a* and 16*b,* respectively.

However, in circuit 26 that applies despreading to the dedicated pilot signal channel, reception timings of pilot signals are controlled by external pilot signal reception timing determination circuits (reference numerals 3 and 4 in FIG. 1). That is, pilot signal reception timings (integration period of the integrator: that is, correlation detection period) are randomized.

Figure 3:
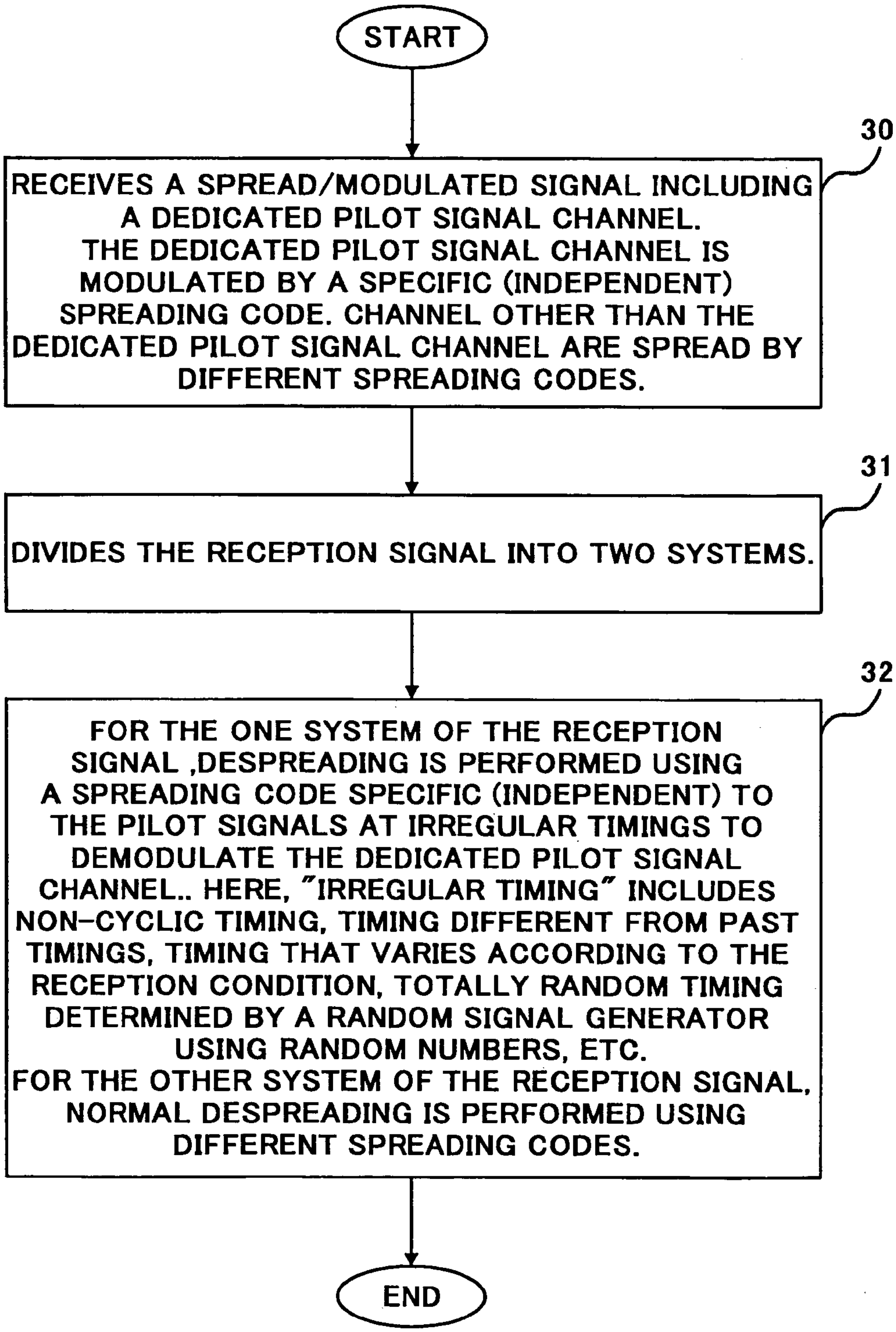
FIG. 3 is a flow diagram showing characteristic operations of the despreading circuit shown in FIG. 2.

FIG. 3 shows main operations of despreading circuit 2 shown in FIG. 2.

That is, a spread/modulated signal including a dedicated pilot signal channel is received first (step 30). Here, the dedicated pilot signal channel is modulated by a specific (independent) spreading code. Channels other than the dedicated pilot signal channel are spread by different spreading codes.

Then, the reception signal is divided into two systems (step 31).

Then, the one system of the reception signal is subjected to despreading using a spreading code specific (independent) to the pilot signals at irregular timings and the other system of the reception signal is subjected to normal despreading using a different spreading code (step 32). Here, "irregular timing" includes non-cyclic timing, timing different from past timings, timing that varies according to the reception condition, totally random timing determined by a random signal generator using random numbers, etc.

Despreading circuit 2 in FIG. 2 divides the reception signal into two systems and performs processing on both systems simultaneously, which achieves high processing efficiency.

Furthermore, despreading circuit 2 performs despreading on the dedicated pilot channel, which is sent from the transmitting side all the time, using a spreading code specific to the pilot channel. Thus, there is no need to be aware of demodulation of other data. Thus, there are no restrictions on determining reception timings and it is possible to freely randomize reception timings.

Furthermore, the circuit in FIG. 2 eliminates the need for complicated switching operations of the switch to differentiate the pilot signals from other data, eliminates the need for complicated timing control and facilitates construction of the circuit.

(Embodiment 2)

Figure 4:
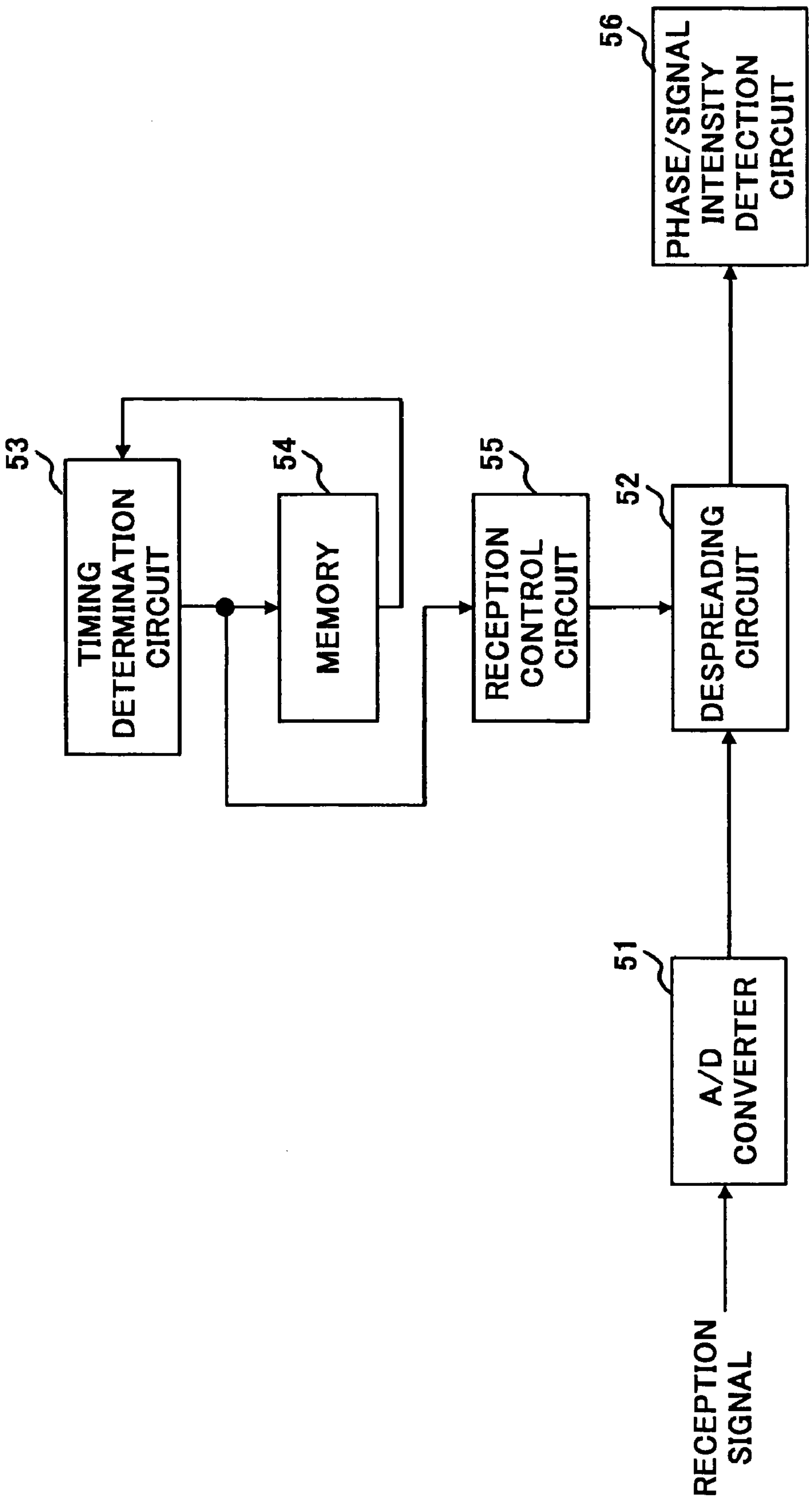
FIG. 4 is a block diagram showing another configuration example of the demodulation section of the CDMA receiver of the present invention.

FIG. 4 shows another configuration example of the demodulation section of the receiver.

In this embodiment, a symbol reception timing in a preceding slot is stored. Then, when a symbol reception timing in the next slot is determined, the stored timing or a predetermined period including this timing is designated as a selection prohibition period. Then, symbol reception timings for the next slot are randomly determined.

First, a reception signal is quantized by A/D converter 51 and input to despreading circuit 52.

Despreading timing determination circuit 53 generates reception timing information. The timing information is given to reception control circuit 55 and at the same time stored in memory 54.

The timing information immediately before being stored in memory 54 is returned to timing determination circuit 53.

When the timing determination circuit determines the next reception timing, the stored timing or a period close to this timing is designated as a reception prohibition period. Then, the next reception timing is randomly determined for other periods except the reception prohibition period.

Reception control circuit 55 controls operation of despreading circuit 52 based on the timing information. Despreading circuit 52 outputs a demodulated signal and transmits the demodulated signal to phase/signal intensity detection means 56.

Figure 5:
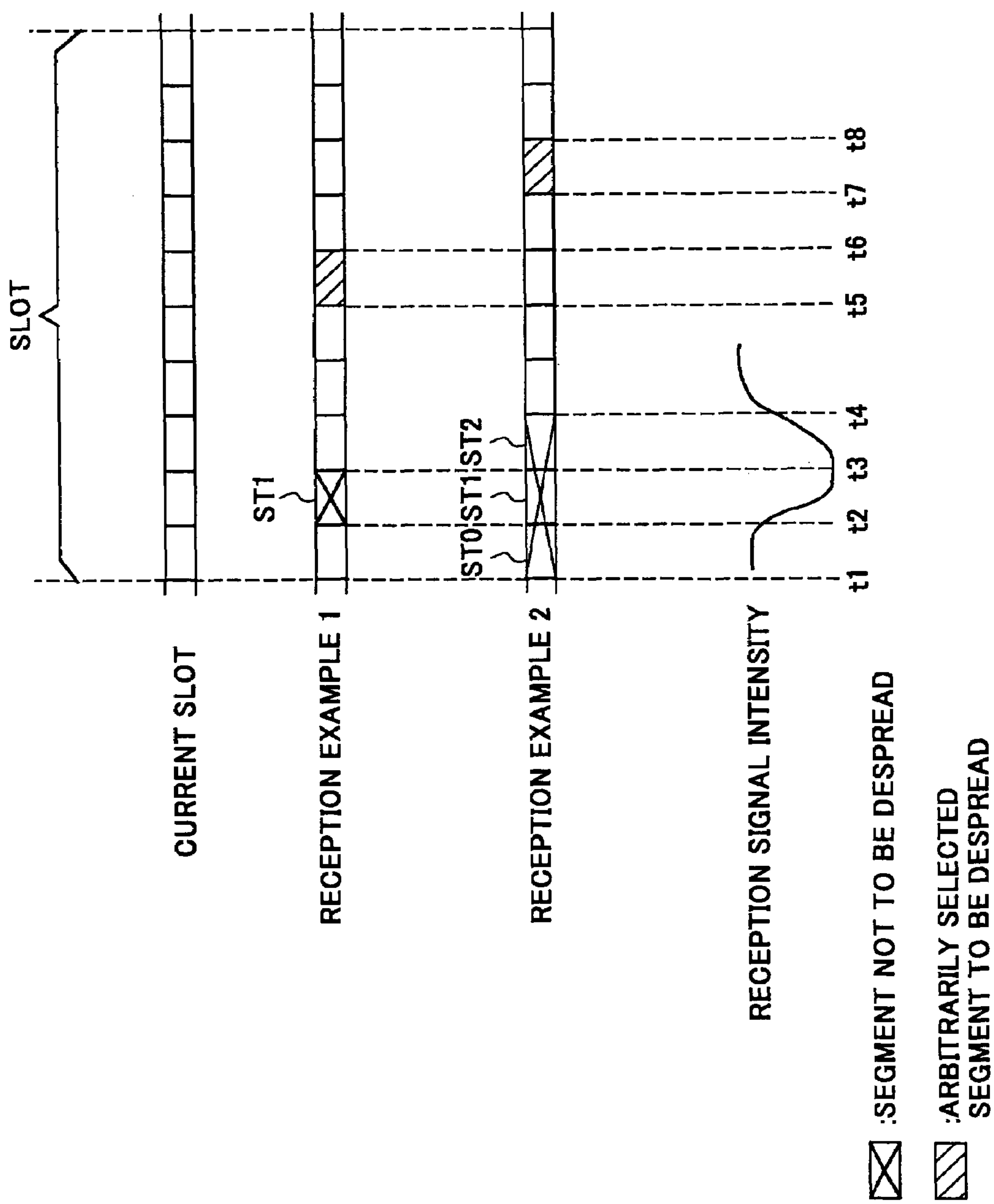
FIG. 5 is a diagram showing an example of despreading timing in the demodulation section of the CDMA receiver in FIG. 4.

FIG. 5 shows an example of pilot signal reception timing.

In reception example 1 in FIG. 5, the symbol currently being received ST1 (time t2 to t3) is assumed to correspond to a period during which the signal intensity of cyclic fading is low. That is, during reception of the next pilot signal, symbol ST1 is excluded from the symbol to be despread. Then, symbols to be received are randomly selected from among symbols other than symbol ST1.

In reception example 2 in FIG. 5, the period (t1 to t4) including symbols before and after symbol ST1, which is currently being received, is designated as a period not to be despread during reception of the next pilot signal.

That is, a predetermined number of symbols including the symbol are excluded from the symbols to be received. Then, reception symbols are randomly selected from among other symbols.

In this way, in this embodiment, symbol reception in the next slot is determined in such a way as to exclude a symbol reception timing in one slot. This makes it possible to receive pilot signals resistant to cyclic and burst-like fading.

(Embodiment 3)

Figure 6:
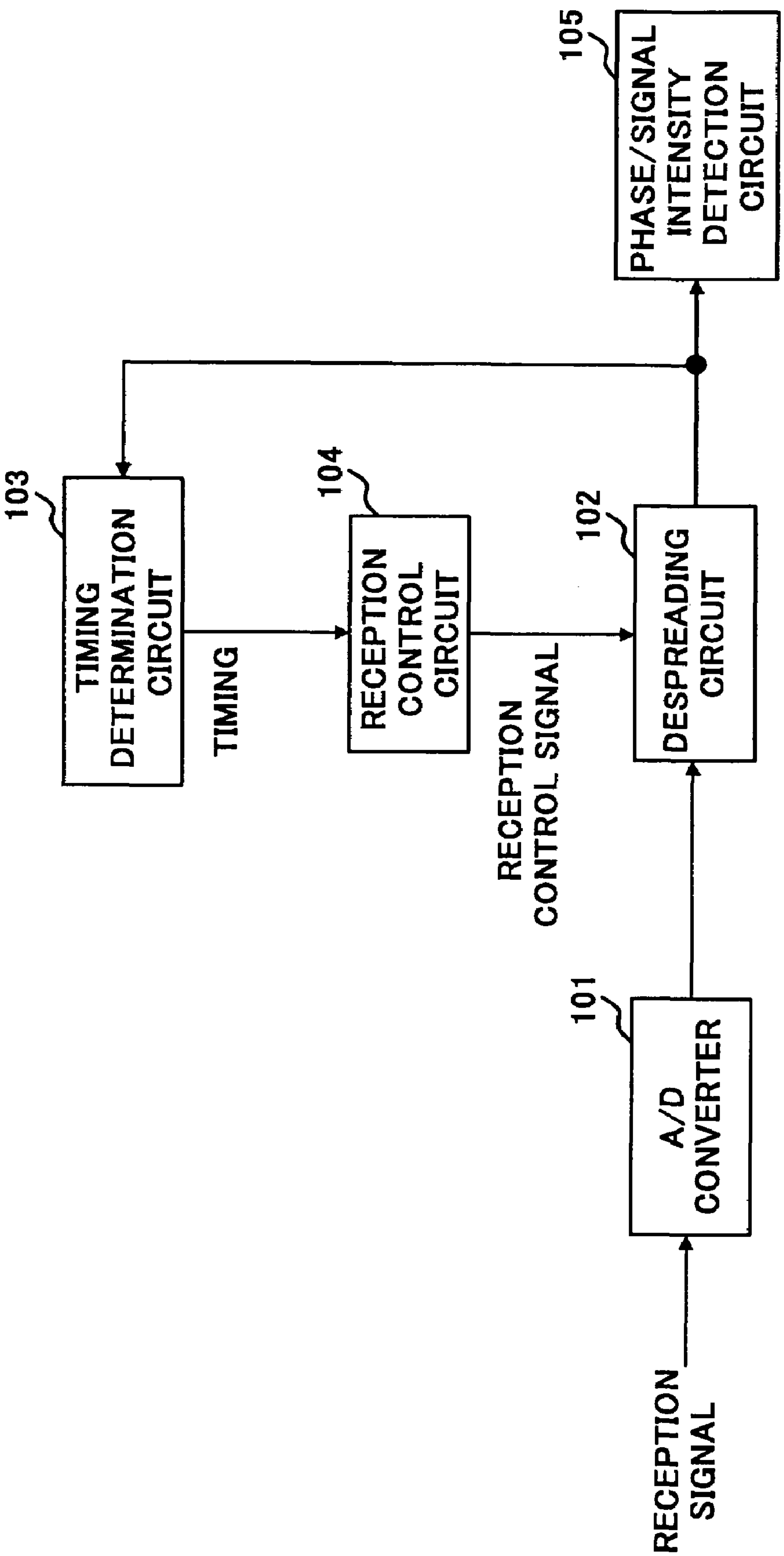
FIG. 6 is a block diagram showing another configuration example of the demodulation section of the CDMA receiver of the present invention.

FIG. 6 shows a configuration of the receiver of this embodiment.

In this embodiment, despreading timings are adaptively changed based on the reception intensity of a demodulated signal after despreading.

FIG. 6 shows a main configuration of the receiver of this embodiment.

The output signal of despreading circuit 102 is fed back to despreading timing determination circuit 103 as a monitor signal.

Despreading timing determination circuit 103 measures the signal intensity of the demodulated signal over a plurality of slots.

When, the intensity of the reception signal is reduced (that is, reception reliability is lowered) under the influence of cyclic fading seen from the overall demodulation result of a plurality of slots, the period during which the reception intensity is low is designated as a reception prohibition period.

Figure 7:
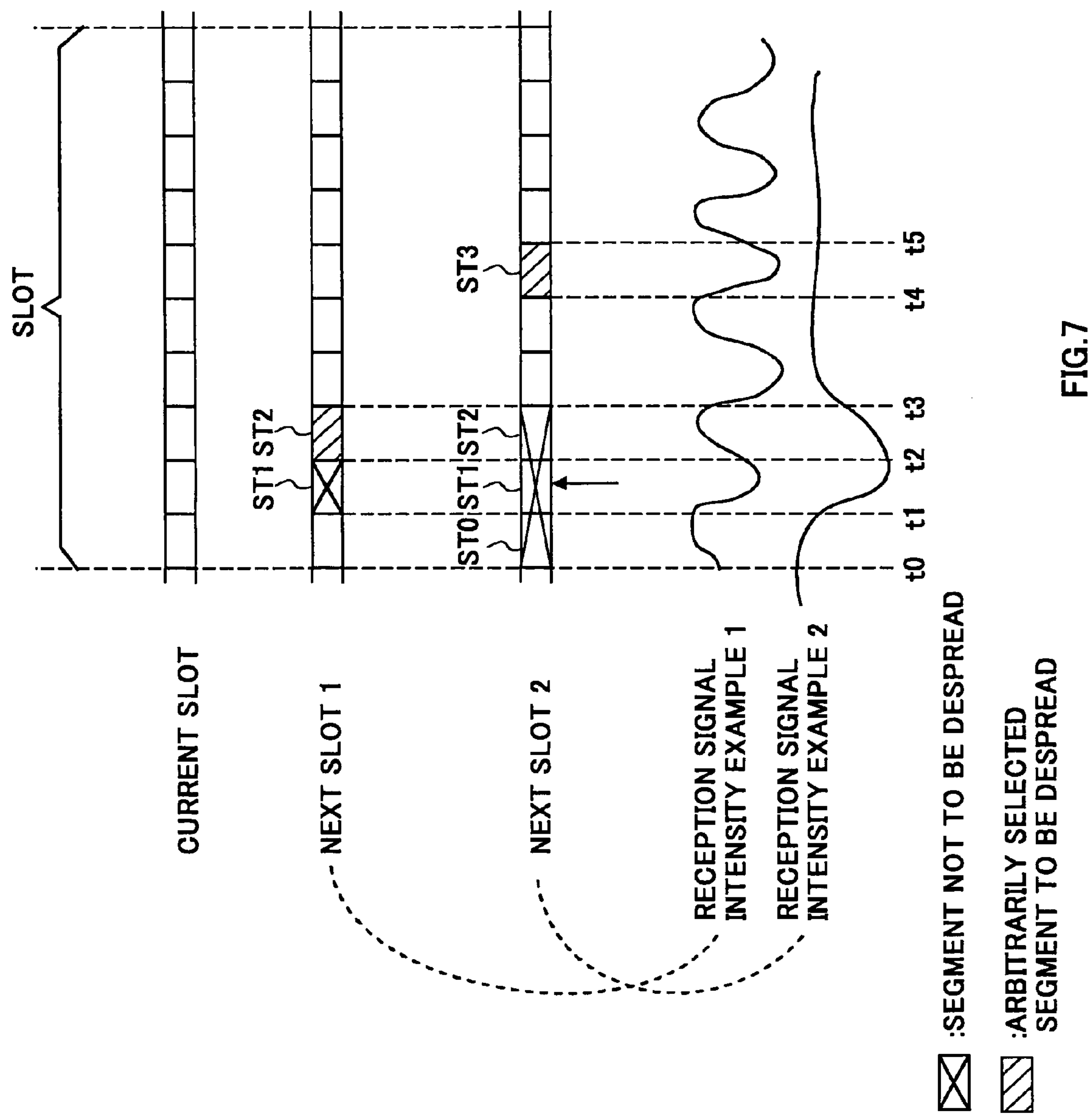
FIG. 7 is a diagram showing an example of despreading timing in the demodulation section shown in FIG. 6.

FIG. 7 shows a reception example.

There is no problem if sufficient intensity of the demodulated signal is obtained as a result of despreading symbols in the current slot, and the next despreading can be performed at the same timing as the current one.

On the other hand, when the level of the demodulated signal jitters cyclically as in Example 1 of the intensity of the reception signal shown in the lower part of FIG. 7, this can be considered as a reflection of fading with an extremely short frequency.

Thus, for symbol despreading in the next slot, symbol ST2 adjacent to the prohibited symbol ST1 is selected as the symbol to be received as shown in Example 1 of the next slot. That is, the reception timing is slightly delayed.

On the other hand, when the level of the demodulated signal fluctuates as in Example 2 of the intensity of the reception signal shown at the bottom of FIG. 7, it can be considered that a temporary (burst-like) drop of the signal intensity spanning over a plurality of symbols is produced in the reception signal.

In this case, a certain period (time t0 to t3) including symbols ST0 and ST2 before and after the prohibited symbol ST1 as shown in Example 2 of the next slot is designated as a period not to be despread. Then, despread symbols are randomly selected from symbols outside the period and the despreading timing (reception timing) is determined.

Based on the despreading timing information determined in this way, reception control circuit 104 in FIG. 6 controls operation of despreading circuit 102. Despreading circuit 102 outputs the demodulated signal.

Thus, this embodiment adaptively changes despreading timings while measuring the reliability of the demodulated signal. This can make reception timings irregular (randomization) based on the actual reception situation. This makes it possible to receive fading-resistant pilot signals.

(Embodiment 4)

Figure 8:
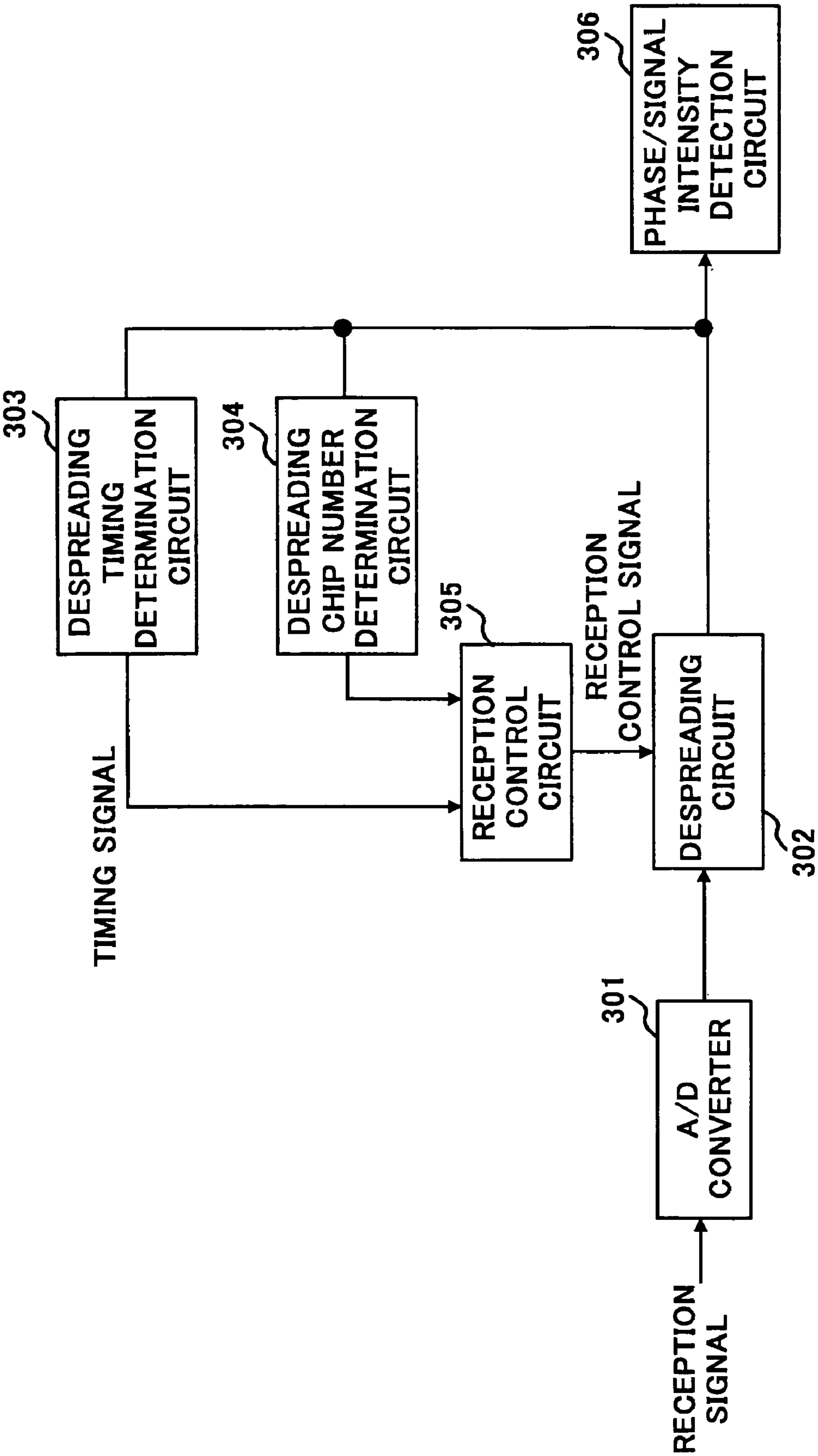
FIG. 8 is a block diagram showing another configuration example of the demodulation section of the receiver of the present invention.

FIG. 8 shows a configuration of the demodulation section of the CDMA receiver of this embodiment.

In this embodiment, pilot signals are not subjected to data (symbol) modulation. That is, pilot channels have no concept of slot. Thus, it is possible to freely determine the reception segment of pilot signals.

That is, if the timing of a spreading code coincides with that of a reception signal, a correct despreading result can be obtained irrespective of which chip despreading is started with or up to which chip despreading is performed.

This embodiment is provided with despreading timing determination circuit 303 and despreading chip number determination circuit 304 and these circuits are received a demodulated signal output from despreading circuit 302.

Despreading timing determination circuit 303 determines the chip with which despreading is started at fixed intervals. The timing determination method in the despreading timing determination circuit is the same as the method explained in Embodiment 3, for example. The despreading chip number determination circuit determines the number of chips to be despread at fixed intervals.

Despreading chip number determination circuit 304 analyzes the past reception situations and determines a carrier frequency error and a chip rate error.

When the carrier frequency error increases, phase rotation at symbol points also increases. For example, when there is a large shift in the carrier frequency, if the number of chips to be despread is increased, the phase at the symbol point gradually rotates, which may prevent in-phase cumulative additions. Therefore, when the carrier frequency error is large, it is necessary to reduce the number of chips to be despread.

Furthermore, when the chip rate shift is large, increasing the number of chips to be despread is not so meaningful. Therefore, it is necessary to reduce the number of chips to be despread and carry out tracking operation whenever necessary.

The determined despreading timing and the signal indicating the number of chips to be despread are given to reception control circuit 305.

Reception control circuit 305 controls operation of despreading circuit 302. Furthermore, despreading circuit 302 outputs a demodulated signal and this demodulated signal is given to phase/signal intensity detecting means 306.

(Embodiment 5)

In this embodiment, a transmitter and receiver are equipped with a same random timing generator.

The transmitting side places pilot symbols at a random timing, which is neither cyclic nor burst-like. That is, the transmitting side creates and sends a transmission signal with pilot signals randomly distributed on a pilot channel.

In this case, other data (control information, etc.) is inserted into areas of the transmission signal where no pilot data exists.

Figure 15:
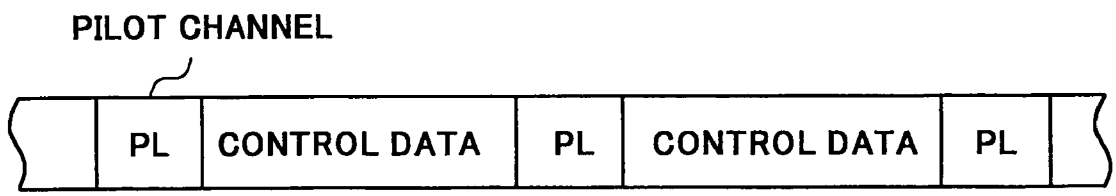
FIG. 15 is a drawing showing a signal format example used in the communication system explained in FIG. 9, FIG. 10 and FIG. 11.

For example, in the pilot channel shown in FIG. 15, pilot signals (PL) are irregularly distributed and control data is inserted in other areas.

Figure 9:
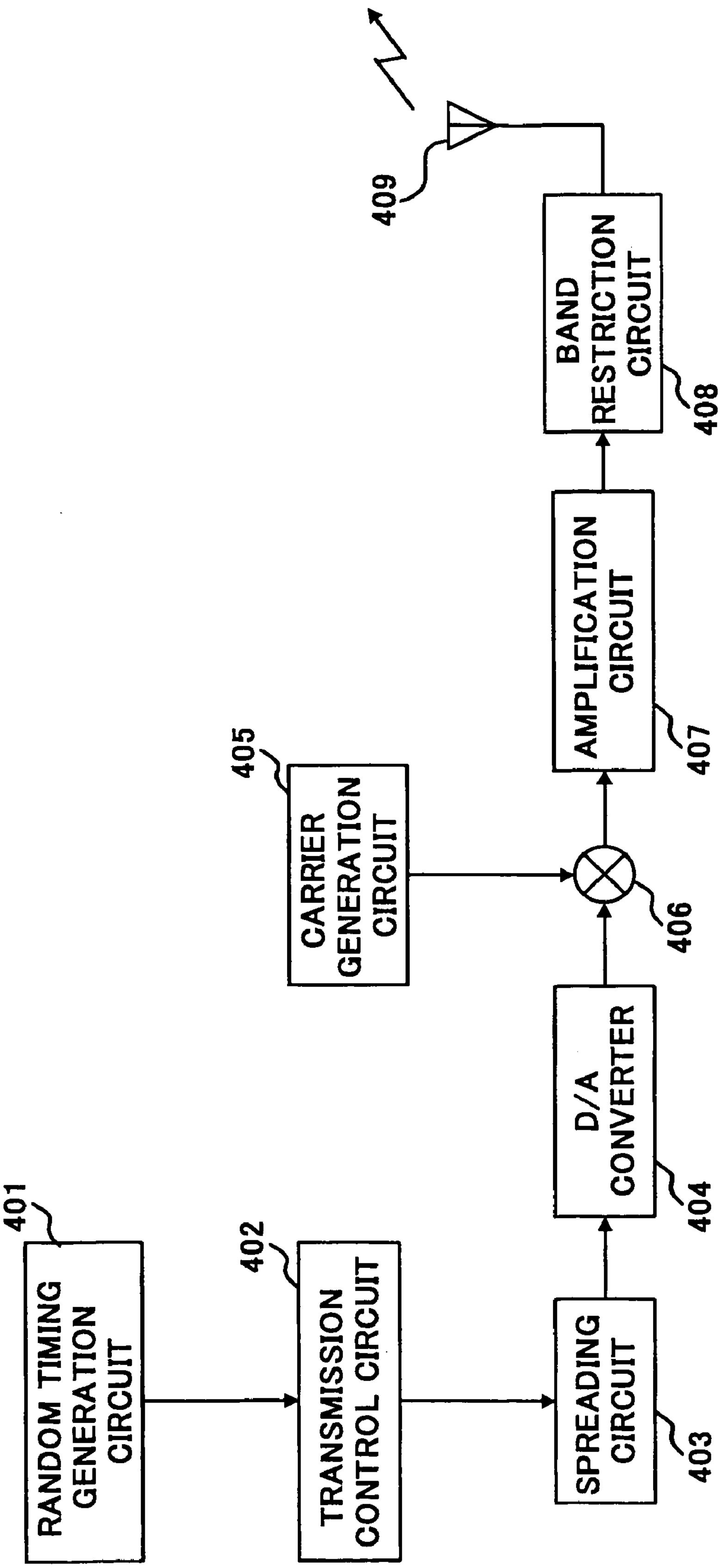
FIG. 9 is a block diagram showing a configuration example of the apparatus on the transmitting side to implement another example of the pilot signal reception method of the present invention.

Hereinafter, the transmitter and receiver will be explained using FIG. 9 and FIG. 10. FIG. 9 is a block diagram showing a configuration of the transmitter and FIG. 10 is a block diagram showing a configuration of the receiver.

The transmitter in FIG. 9 is equipped with random timing generation circuit 401, transmission control circuit 402, spreading circuit 403, D/A converter 404, mixer 406, carrier generation circuit 405, amplification circuit 407, band restriction circuit 408 and antenna 409.

Pilot signal spreading timings in spreading circuit 403 are controlled based on a control signal generated from random timing generation circuit 401.

Figure 10:
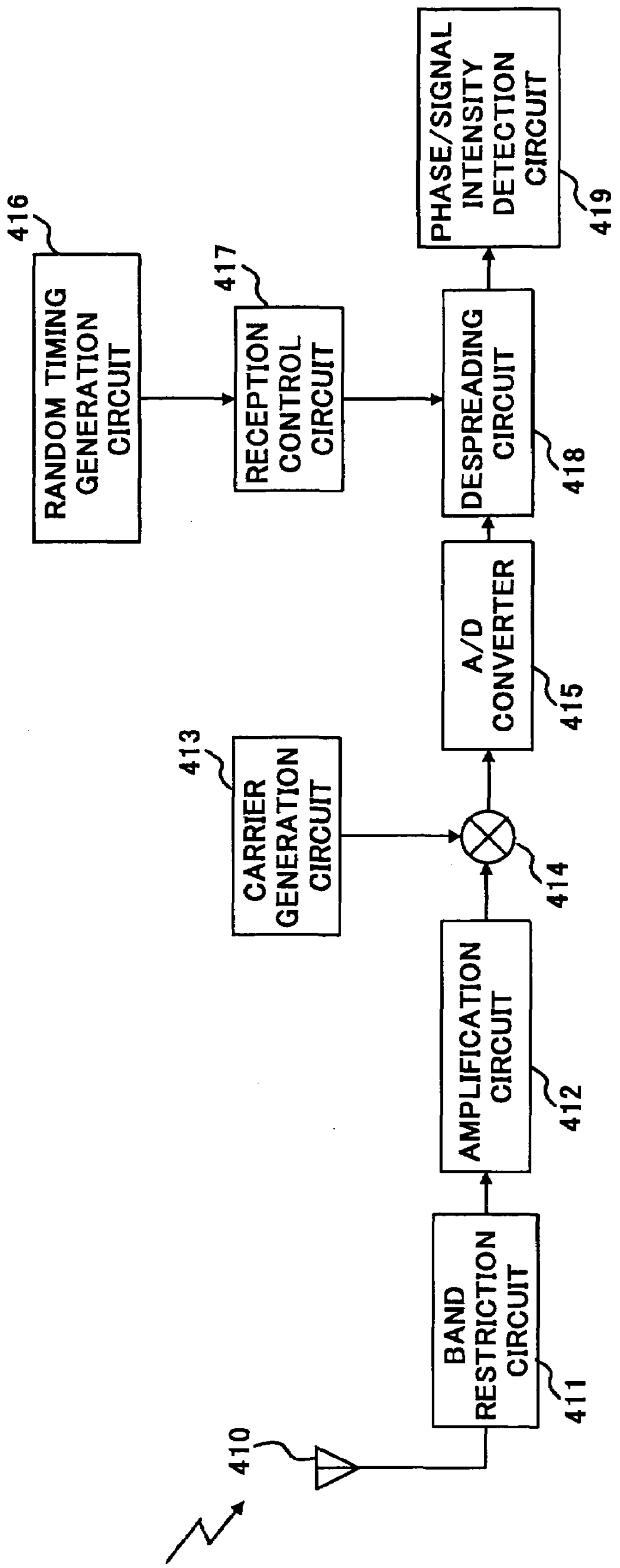
FIG. 10 is a block diagram showing a configuration example of the apparatus on the receiving side to implement another example of the pilot signal reception method of the present invention.

On the other hand, the receiver in FIG. 10 is equipped with antenna 410, band restriction circuit 411, amplification circuit 412, carrier generation circuit 413, mixer 414, A/D converter 415, random timing generation circuit 416, reception control circuit 417, despreading circuit 418 and phase/signal intensity detection circuit 419.

Random timing generation circuit 416 generates a timing control signal under the same condition as that of the transmitter. Pilot signal despreading timings in despreading circuit 418 are controlled according to this timing control signal.

Thus, distributing pilot signals irregularly makes the system less susceptible to cyclic fading or burst-like fading. On the other hand, since the receiving side knows the locations of pilot signals beforehand, there is no problem with reception of pilot signals.

Furthermore, distributing pilot signals using a common random timing generator for the transmitting side and receiving side also provides a kind of encryption effect.

Figure 11:
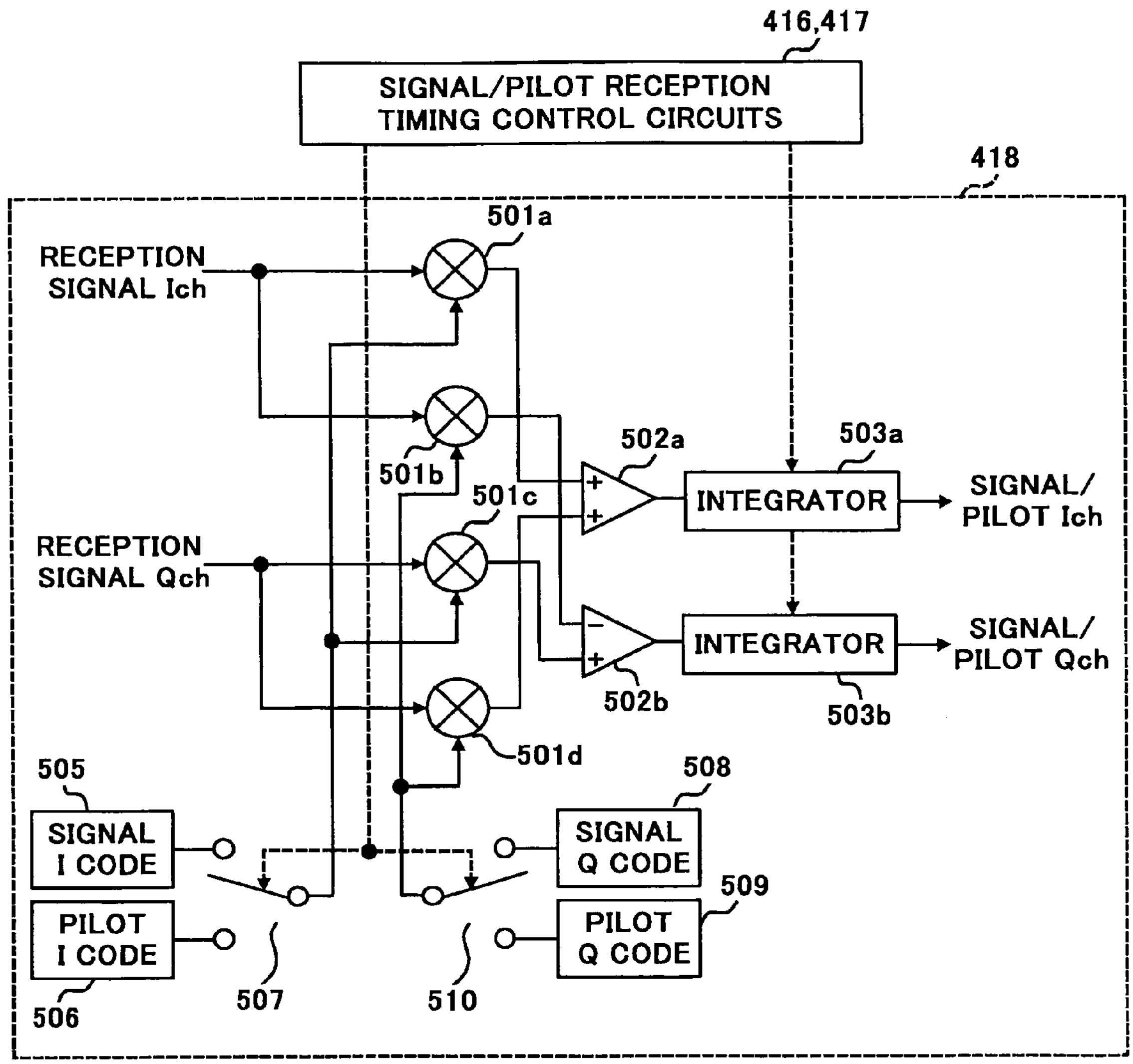
FIG. 11 is a block diagram showing a specific configuration example of the despreading circuit shown in FIG. 10.
Figure 12A:
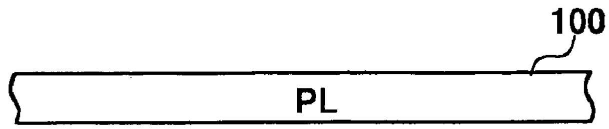
FIG. 12A is a drawing to explain an example of communication method using pilot channels.
Figure 12B:
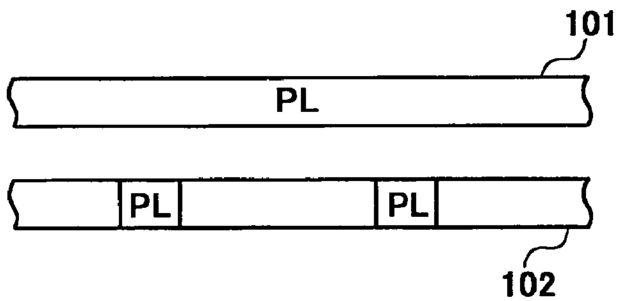
FIG. 12B is a drawing to explain another example of communication method using pilot channels.
Figure 12C:
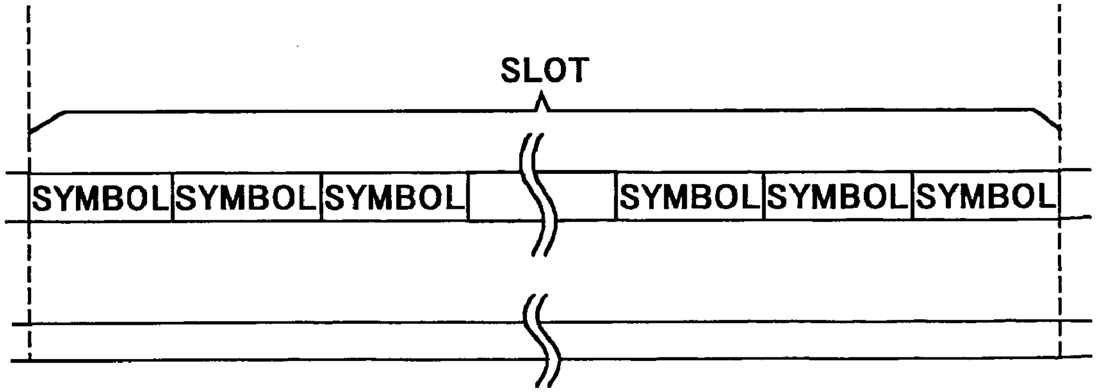
FIG. 12C is a drawing showing a slot format example of a CDMA communication system.

FIG. 11 is a block diagram showing a specific example of an internal configuration of despreading circuit 418 shown in FIG. 10.

As shown in the figure, two systems of QPSK-modulated signal (I signal and Q signal) are input to despreading circuit 418.

Despreading circuit 418 is equipped with multipliers 501*a* to 501*d*, comparators 502*a* and 502*b*, integrators 503*a* and 503*b*, code generators 505, 506, 508 and 509 and switches 507 and 510.

The reception timing control circuits (416 and 417) control an integration period (period for calculating correlation value) in integrators 503*a* and 503*b*. Moreover, switches 507 and 510 are switched by the reception timing control circuits (416 and 417).

As described above, the present invention has been explained using 5 embodiments, but the present invention is not limited to these embodiments and can be modified or applied in various manners.

For example, the above embodiment changes despreading timings irregularly, but the present invention is not limited to this. That is, it is also possible to continuously despread pilot signals, temporarily store the despreading results in a buffer and randomly or adaptively select which of the stored demodulated signals should be used (picked up). In this case, though memory to temporarily store pilot signals is necessary, similar effects can be obtained.

As described above, the present invention can secure reception of always-optimal pilot signals less susceptible to fading when pilot signals are received.

The present invention can be easily implemented by simply adding the reception timing determining means to the circuit of the reception apparatus.

The explanations above describe cases of CDMA communications, but the present invention can also be applied to TDMA-based or FDMA-based communications. That is, in the case of a TDMA-based communication, it is possible to adopt a communication format in which pilot signals are randomly distributed. In the case of a FDMA-based communication, the present invention is made applicable by providing a dedicated pilot signal channel.

The present invention is not limited to the above described embodiments, and various variations and modifications may be possible without departing from the scope of the present invention.

This application is based on the Japanese Patent Application No.2000-035052 filed on Feb. 14, 2000, entire content of which is expressly incorporated by reference herein.

What is claimed is:

1. A pilot signal reception method, comprising:

receiving pilot signals of a pilot channel;

despreading the received pilot signals;

measuring a variation in the reception intensity of a demodulated signal obtained by the despreading; and adaptively changing despreading timings of the received pilot signals based on the measured variation in the reception intensity, in accordance with random reception timings, wherein the despreading timings are adaptively determined based on the measured variation in the reception intensity in such a way as to avoid valleys of the variation in the intensity of the reception signal.

2. A pilot signal reception method, comprising:

receiving pilot signals of a pilot channel;

despreading the received pilot signals;

measuring a variation in the reception intensity of a demodulated signal obtained by said despreading; and adaptively changing despreading timings of the received pilot signals based on the measured variation in the reception intensity, in accordance with random reception timings, wherein the despreading timings and despreading period are adaptively changed based on the measured variation in the reception intensity in such a way as to avoid valleys of the variation in the intensity of the reception signal.

3. A receiver that receives pilot signals, comprising:

a despreading circuit that despreads the received pilot signals; a timing determination circuit that determines the start timing of said despreading based on the intensity and variation of the intensity of a demodulated signal output from said despreading circuit; and a despreading chip number determination circuit that determines the number of chips to be despread based on the intensity and variation of the intensity of the demodulated signal output from said despreading circuit, wherein operation of said despreading circuit is controlled based on the determined despreading timing and despreading chip number in such a way as to despread pilot signals adaptively and irregularly.

* * * * *